United States Patent
Breton et al.

(12)

(10) Patent No.: US 6,649,682 B1
(45) Date of Patent: Nov. 18, 2003

(54) PROCESS FOR MAKING WEAR-RESISTANT COATINGS

(75) Inventors: Ernest J. Breton, Louisville, KY (US); John M. Handzel, Floyd Knobs, IN (US); Otis K. Tennant, Underwood, IN (US)

(73) Assignee: Conforma Clad, Inc, New Albany, IN (US)

( * ) Notice: Subject to any disclaimer, the term of this patent is extended or adjusted under 35 U.S.C. 154(b) by 0 days.

(21) Appl. No.: 09/888,672

(22) Filed: Jun. 25, 2001

Related U.S. Application Data (63) Continuation-in-part of application No. 09/466,037, filed on Dec. 17, 1999, now abandoned.
(60) Provisional application No. 60/113,309, filed on Dec. 22, 1998.

(51) Int. Cl.[7] .................................................. C08K 3/38
(52) U.S. Cl. ....................... 524/404; 524/406; 524/407; 524/408; 524/424; 524/434; 524/435
(58) Field of Search ................................ 524/404, 406, 524/407, 408, 424, 434, 435

(56) References Cited

U.S. PATENT DOCUMENTS

| | | |
|---|---|---|
| 3,024,128 A | 6/1962 | Dawson |
| 3,743,556 A | 7/1973 | Breton et al. |
| 3,988,405 A | 10/1976 | Smith et al. |
| 4,000,781 A | 1/1977 | Knapp |
| 4,102,399 A | 7/1978 | Harnsberger |
| 4,242,842 A | 1/1981 | Yancey |
| 4,544,377 A | 10/1985 | Schwen |
| 5,147,460 A | 9/1992 | Otaki |
| 5,238,881 A | 8/1993 | Norris |
| 5,492,550 A | 2/1996 | Krishnan et al. |
| 5,868,819 A | 2/1999 | Guhde et al. |

OTHER PUBLICATIONS

Nicrobraz Technical Data Sheet, No. 2.2.4 Rev. A © Wall Colmonoy Corp. 1995 US.

BrazeCoat® Product Bulletin No. 14.01.04, Issue Date 11/97 "Suspension Materials," Materials Resources International US.

BrazeCoat® "Wear Cladding Material" Product Bulletin No. 14.01.01 Material Resources International 1996 US.

*Primary Examiner*—Edward J. Cain
(74) *Attorney, Agent, or Firm*—Camoriano and Associates; Theresa Fritz Camoriano (57) ABSTRACT

A paint system and process are disclosed for hardfacing metal surfaces. In one embodiment of the process, a paint including a dispersion of hard particles is first applied as a coating to a surface. Next, a paint including a dispersion of a braze alloy is applied over the layer of hard particles. The surface is then heated to cause the braze alloy to melt and infiltrate into the hard particles thereby bonding them to the metallic surface. In another embodiment, a first layer of adhesive is applied, and a hardfacing powder is applied onto the adhesive. Then a second layer of adhesive is applied, and a braze alloy powder is applied onto the second adhesive. Then the material is heated as in the first embodiment. In another embodiment, paint containing hard particles is coated onto the substrate, and an acid-containing cross-linked copolymer in the paint is then neutralized to increase the viscosity of the paint to prevent running.

33 Claims, 1 Drawing Sheet

FIGURE 1

PROCESS FOR MAKING WEAR-RESISTANT COATINGS

This application claims priority from U.S. Provisional Application Ser. No. 60/113,309, filed Dec. 22, 1998, and is a continuation-in-part of U.S. patent application Ser. No. 09/466,037, filed Dec. 17, 1999 now abandoned.

BACKGROUND OF THE INVENTION

The most frequent cause of failure of components of machinery exposed to high abrasion or erosion is wear. The problem is exacerbated when abrasion or erosion is combined with corrosion such as occurs on fan blades used for conveying products of combustion in coal-fired power plants. Many types of coatings have been developed to protect against wear. The most widely used coatings are hard chromium, weld overlays, and thermal spray coatings. Thermal spray coatings are reviewed by Lech Pawlowski in *The Science and Engineering of Thermal Spray Coatings*. (John Wiley & Sons 1995).

Thermal spray coatings of hard particles are made by: Detonation Guns, High Velocity Oxygen Flame Spraying, Plasma Spraying, Wire Arc Spraying, and Flame Spraying. Of these, carbide coatings made with detonation guns are the most resistant to wear. With the exception of vacuum plasma spraying, which is used infrequently relative to other coating processes, all of these means for thermal spraying expose the powders being sprayed to oxygen or water vapor. This leads to metal oxide formation that is detrimental to the coating. They all depend upon mechanical entrainment for bonding the coating to substrates. In some instances, thermally-sprayed coatings are heat treated to enhance bonding. Geometries that can be coated by thermal spraying are limited to line of sight between the end of the spray nozzle and the surface being coated. Further, if the angle of impingement is not constant and at a relatively large value, non-uniform coatings are produced. Thermal spraying is limited to the range of composite structures that can be can be made. For example, spraying particles with a difference in particle diameters of 10 to 1 is difficult, because the powders segregate in the powder delivery systems.

Another process for applying coatings of carbide particles is described in U.S. Pat. No. 3,743,556. It is based upon the infiltration of braze into a layer of tungsten carbide particles. In that process, coatings are made by first applying cloth containing particles of tungsten carbide to a surface needing protection against wear. Another piece of cloth containing particles of braze alloy is placed over the layer of carbide particles. The substrate with the two layers of cloth is placed in an inert-atmosphere furnace and heated to the brazing temperature of the braze alloy. Braze infiltrates down into the carbide particles and brazes them to each other and to the substrate.

The principle disadvantage of the cloth process is the difficulty of making thin coatings less than 0.25 millimeters thick (0.01 inch). The process for making the cloth described in the patent is not amenable to producing such thin cloth. Further, the process is relatively costly because of the expense of making the cloth and manually applying the cloth to surfaces needing protection. While this process can apply very uniform coatings to a much wider spectrum of complex geometries than spray coatings, it is still limited to geometries that can be accessed with fingers or tools. Another disadvantage of the cloth process is seams. They often result in structural discontinuities in the carbide coating.

These disadvantages of both thermal spraying and the cloth methods for applying carbide containing coatings are overcome by the present invention.

The closest prior art is considered to be U.S. Pat. No. 3,743,556, which is hereby incorporated by reference. This patent discloses the infiltration process and commercially produced braze pastes for joining metals. While this patent teaches the use of mixtures of adhesives with tungsten powder and braze powder for applying layers of carbide and braze, it does not disclose the use of paints made in accordance with the present invention.

The rheology of braze pastes available from Wall Colmonoy Corporation, Madison Heights, Mich. would not result in stable carbide paints. Densities of the nickel/chromium braze alloys that are suspended in these pastes are around 8 grams per cubic centimeter, which is far less than the density of the suspended particles used in the paints of the present invention. The Wall Colmonoy product literature describes its braze pastes as having viscosities up to 400 centipoises.

In the prior art, grinding wheels are made by mixing hard particles with adhesives. But they are not formulated into paints that can be applied to vertical surfaces. They are cast into shapes of abrasive wheels. Another type of grinding wheel is made by brazing particles of diamonds or tungsten carbide onto the outer periphery of steel wheels. A variation of this is brazing larger particles of tungsten carbide to grippers for manipulating pipe and other objects. These grinding wheels, files, and grippers are made using a brazing technology in which the braze is placed between the surface being coated and the hard particles.

The inside of a pipe has been coated by the procedure described in U.S. Pat. No. 4,490,411. It describes distributing particles in a semi-fluidized state within the inside diameter of a tube as it is simultaneously heated and rotated. This has the problem of maintaining mixed powders of two different densities in the fluidized state. They tend to classify or separate by density, which inhibits the uniform distribution of the powders.

SUMMARY OF THE INVENTION

The present invention takes advantage of the best features of both the thermal spraying and cloth processes by using a process based upon paint technology. In a first embodiment of the invention, hardfacing particles and braze-alloy particles are made into separate paints. The hardfacing particle layer is first "painted" over the area of metal needing protection. Over that, a layer of braze is "painted." The surface thus coated is heated in a furnace in an inert atmosphere to a temperature that is above the melting (liquidus) temperature of the braze alloy. The braze alloy then infiltrates down into the layer of hardfacing particles and brazes (metallurgically bonds) them into a composite of hard particles in a matrix of braze alloy onto the substrate metal. The resulting coating is comprised of hard particles metallurgically bonded to the substrate metal. It poses resistance to abrasion and erosion far above that of tool steels, hard chromium, and most thermally sprayed carbide coatings. It can be applied to various shapes, including concave shapes, such as the inside diameters of long pipes, inside of pipe elbows, inside of pumps, valves, and onto other complex geometries that cannot be coated by thermal spraying or by the cloth-based coating processes.

The density of tungsten carbide, which is a preferred hardfacing particle, is about 15 grams per cubic centimeter. Other hardfacing particles used in the paints of this invention also have a density greater than 10 grams per cubic centimeter. Making layers of hardfacing particles and braze particles in the infiltration process for making carbide-containing coatings has been hampered by the difficulty of making stable paints containing such dense particles. Since the density of tungsten carbide is 14 to 15.4 times greater than that of water, the tungsten carbide has a great tendency to settle in paint formulations. We have discovered that the stability of a tungsten carbide paint is dependent upon the difference in viscosities of the paint at high and low shear rates of the paint. In other words, we want the paint to be very viscous at low shear rates, such as after it has been painted onto a substrate, so the hard particles will stay in place on the substrate, and we want the paint to be much less viscous at high shear rates, so that it can readily be sprayed onto the substrate. Tungsten carbide paints having low-shear viscosities below around 100,000 centipoises sag severely when applied to vertical surfaces. The high viscosity of the paint has to be achieved by increasing the viscosity of the adhesive used to make the paint rather than by adding more carbide particles.

In a second embodiment of the invention, a layer of adhesive is applied to a metal substrate, and hardfacing particles are applied to that adhesive layer. After drying, another layer of adhesive is applied over the adhered hard particles. Braze powder is then applied to the layer of wet adhesive thus forming a layer of braze particles in juxtaposition to the layer of hard particles. Heating in an inert atmosphere then causes metallurgical fusion, which produces a composite of hard particles in a matrix of braze metallurgically bonded to the substrate metal.

In a third embodiment, a hardfacing alloy powder containing precipitated intermetallic hard compounds is made into a paint and applied to the surface being protected. After drying, it is then heated in an inert atmosphere to a temperature above the solidus of the hardfacing alloy to form a fully dense coating of the hardfacing alloy metallurgically bonded to the substrate.

In a fourth embodiment, hardfacing particles and a hardfacing braze alloy powder are made into a paint and applied to the surface being protected. It is then dried and heated in an inert atmosphere to a temperature above the solidus of the hardfacing alloy to effect metallurgical bonding of hardfacing particles to the substrate by the hardfacing alloy.

DESCRIPTION OF THE INVENTION

There are several different ways of producing a wear-resistant coating within the scope of the present invention. All the methods include forming a hard particle layer on a metal substrate, wherein the hard particles are metallurgically bonded to the substrate and to a braze material.

Figure 1:
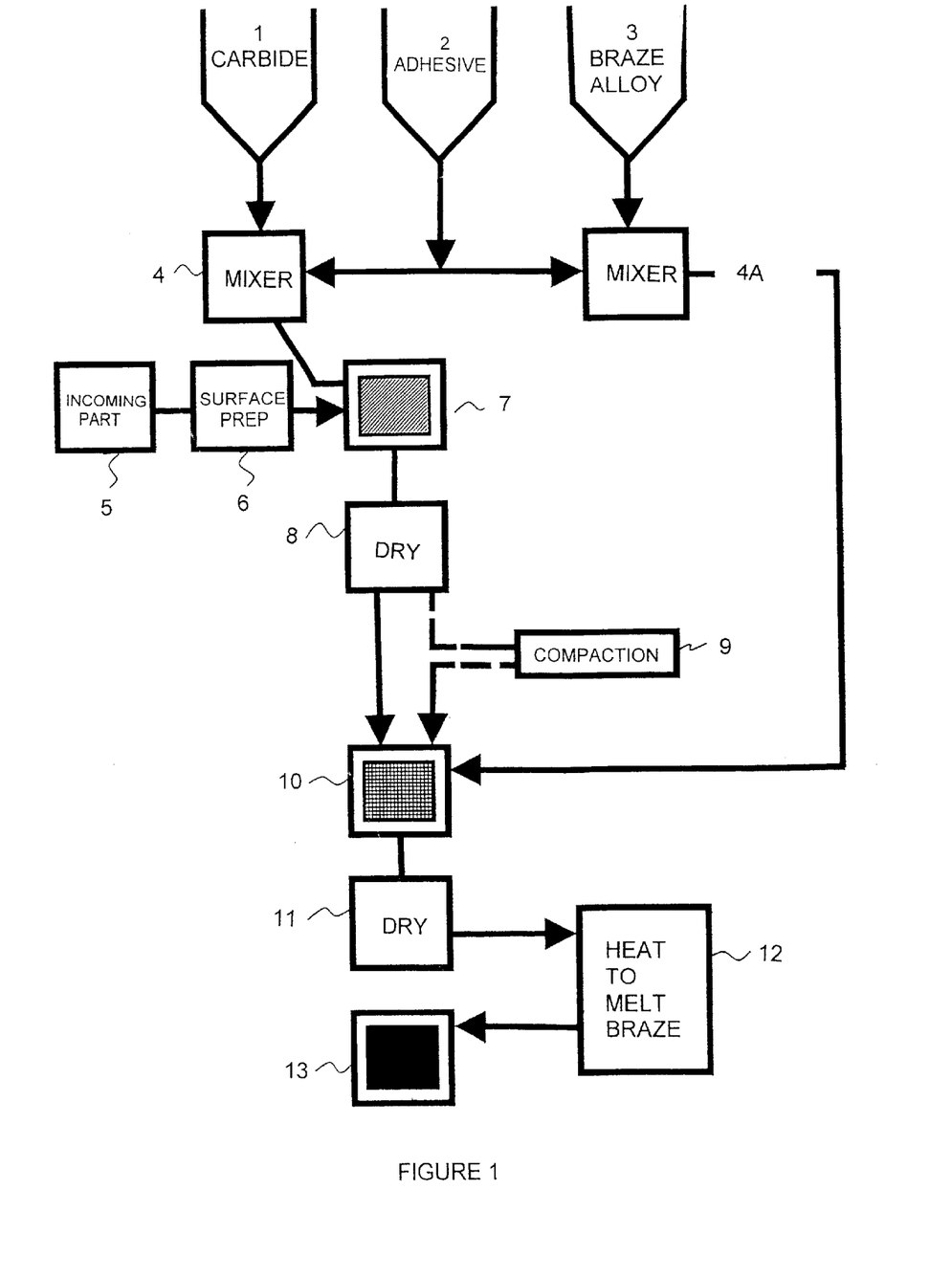
FIG. 1 is a schematic of a first embodiment of a process for producing wear-resistant coatings in accordance with the present invention.

A first embodiment of a process for producing wear-resistant coatings in accordance with the present invention is depicted in FIG. 1. It includes three stages. The first stage is making two different paints—a carbide or hard particle paint, and a braze alloy paint. In order to prepare the paints, the hard particles 1 and adhesive 2 are mixed together in a mixer 4, and the braze alloy 3 and adhesive 2 are mixed together in a mixer 4A. The second stage is applying the layers of paint to parts being coated, as shown in steps 5–9. First, one or more layers of the hard particle paint are applied to the substrate and dried. Then, one or more layers of the braze alloy paint are applied to the substrate. The substrate with applied paint layers may be compacted either before or after the braze paint is added. The third stage is heating the substrate and applied paint layers to braze the hard particles to the metal surfaces being protected in steps 10–13.

Several alternate embodiments are also possible. For example, one or more of the layers of hard particles or braze alloy may be applied by first applying a layer of adhesive paint and then dusting the adhesive with powdered particles (either hard particles or braze alloy particles).

Another alternative is that, once the layer (or layers) of hard particles has been applied to the substrate, the layer of braze alloy may be applied by traditional methods, such as cloth technology, which will be referred to below.

In another alternative, the hard particles and the braze particles are mixed together in a single paint, so that it is not necessary to apply two different types of paint to the substrate.

In another alternative, the hard particles are a braze material that includes precipitates of intermetallic hard compounds. In that case, a hard surface may be formed without adding additional separate hard particles, since the braze particles themselves are hard particles.

In any of the foregoing methods, when a layer of hard particle paint or adhesive paint is applied to a substrate, it is also possible to apply additional material to the substrate either before or after applying the paint, or both before and after applying the paint, in order to greatly increase the viscosity of the paint on the substrate so it does not run.

Now that the basic methods are understood, the materials used in those methods will be described in more detail.

Hardfacing Particles

Hardfacing particles resistant to wear are intermetallic compounds formed between titanium, zirconium, vanadium, niobium, tantalum, chromium, molybdenum, tungsten, or iron and carbon, boron, silicon, aluminum, nitrogen, phosphorus, or carbonitride. The hardfacing particles and the braze alloy may be added separately, or the braze alloy may itself be hardfacing particles, if there are hard precipitates within the braze alloy itself. Preferred hardfacing particles include chromium carbide, cobalt-bonded tungsten carbide, nickel-bonded tungsten carbide, vanadium carbide, titanium carbide, tantalum carbide, chromium carbide, molybdenum silicide, silicon nitride, chromium boride, nickel phosphide, tungsten carbonitride, titanium carbonitride, vanadium carbonitride, molybdenum carbonitride, and niobium carbonitride. Hardfacing particles must meet three criteria: first, the hardfacing particles must have a Vickers hardness of above 1000, second, they must be wettable by the selected braze alloy to achieve infiltration, and third, hardfacing particles should not be extensively dissolved by the molten braze alloy.

The size of the hardfacing particles is selected to achieve desired wear protection. This depends upon the application. The hardfacing particle size can range from one micron or less to over 5 mm. One to 10 micron particles are preferred for typical applications subject to erosion in a fluid environment. For highly abrasive materials greater than 5 mm in size, hardfacing particles of 1,000 to 5,000 microns are preferred. For abrasion by common sand, particles from 2 to 80 microns are preferred.

Hardfacing particles less than 15 microns in size are preferred for making thin coatings less than 0.1 mm thick. Larger particles can be used for making thicker coatings over 0.2 mm thick. We have found that particles less than 10 microns in size result in the most stable paints. However, for some applications, such as the coating of the inside of a pipe, paints of hard particles with a mean particle size of 40 microns and greater are preferred.

Maximum resistance to wear of a coating is attained through maximizing the volume percent of admixed hard particles in the coating. This is achieved through filling the void space of closest-packed large particles with smaller particles whose size is less than $1/8^{th}$ of the size of the larger particles. Less than $1/10^{th}$ is preferred. As a rule of thumb, the void volume of closest-packed, near equiaxial particles is about 40%. In the practice of this invention, paints contain at least two different size particles of tungsten carbide. The larger has a mean size of 44 microns, and the smaller is 2 to 5 microns. Depending upon the application, the volume ratio of large to small carbide particles range from 3 to 2 up to 4 to 1.

The concentration of hard particles in coatings can be further increased by using three different sizes of particles. Coatings have been made of mixtures of particles of tungsten carbide 4,000 microns, 40 microns, and 2 microns in size in the volume ratio of 6 to 2.4 to 1.6. These coatings are formulated for the most severe environments.

An important requirement of the hardfacing metal particles is their wettability by whatever braze alloy is used. For good infiltration to occur, molten braze metal has to wet the surfaces of the hard particles.

Hardfacing Alloys Including Hard Precipitates

Hardfacing alloys with high resistance to wear are iron, nickel, or cobalt base alloys which form precipitated hard particles in the form of intermetallic compounds between titanium, zirconium, vanadium, niobium, tantalum, chromium, molybdenum, tungsten, or iron and carbon, boron, silicon, aluminum, nitrogen, or carbonitride. In order for an iron, nickel, or cobalt base alloy with hard precipitates to function as a hardfacing alloy by itself, it should precipitate a sufficient amount of hard particles to increase the Rockwell C hardness of the alloy to above 50. Above Rockwell C 60 is preferred. The preferred hard precipitated intermetallic compounds include tungsten carbide, chromium carbide, molybdenum carbide, niobium carbide, and chromium boride.

The solidus of the hardfacing alloy should be below the melting point of the metal substrate being protected. For protecting steel, the preferred solidus of the hardfacing alloys is below 1200 Celsius. The solidus and liquidus of hardfacing alloys are lowered by the incorporation of boron, silicon, or phosphorous into the chemistry of the hardfacing alloy.

In general, the hardfacing alloys which contain substantial hard precipitates are preferred for use both to braze admixed hardfacing particles onto the substrate and to form hardfacing surfaces on their own, without the admixture of additional hard particles. However, alloys which do not form substantial hard precipitates could be used with admixed hardfacing particles to form a hard surface as well. While paints with added carbide-based hard particles provide maximum wear protection, paints made from hardfacing alloys with hard precipitates also provide a suitable hard surface for many applications. For example, paints may be made using nickel/chromium alloys containing boron or silicon for melting point reduction and iron, molybdenum, tungsten, manganese, carbon, or combinations of those alloys for obtaining desired mechanical properties. These alloys would be made into the paints of the present invention, applied by suitable means, and fused to obtain metallurgically bonded wear resistant coatings.

The term hardfacing includes composite coatings of hard particles metallurgically bonded to a metal substrate using a braze alloy, whether the hard particles are admixed separately or whether they are precipitates within the braze alloy itself.

Maximum packing of hard particles within the composite coating can be obtained by mixing two different sizes of hard particles, such that the small particles fill the void volume of the large particles in their fully compacted state. Guidelines for selecting particle size distributions for maximum packing are given in *Particle Packing Characteristics* by Randall German published by The Metal Powder Industries Federation, which is hereby incorporated by reference.

The Paint Formulation

Considering possible harm to humans and the environment, water-based paints are preferred in the practice of this invention, though it is not limited to water-based paints. In general, paint formulations require chemicals that perform the following functions: (1) Dispersion, (2) Thickening, (3) Adhesion, (4) Surface-tension reduction, and (5) Foam reduction. The selection of chemicals and their concentrations to perform these functions has to be tailored to the requirements of the paint.

For use in the paint-based hardfacing process of this invention, paints may be applicable by spraying, brushing, dipping, and related means. And they should resist sagging on vertical surfaces at thicknesses of over 0.17 mm, and preferably over 0.22 mm.

While the prior art teaches paints incorporating various metals, it does not teach paints that incorporate very dense particles on the order of the densities of the hard particles and hardfacing alloys used in the present invention. For example, titanium dioxide, a widely used pigment, has a density of 4.3 grams per cubic centimeter, whereas the density of cobalt-bonded tungsten carbide, which is our preferred hard particle, has a density of 14.8 grams per cubic centimeter. Hence, the gravitational force causing sagging on vertical surfaces is 3.4 times greater in tungsten carbide containing paints than in titanium dioxide containing paints. Hardfacing paints based upon tungsten carbide that resisted sagging at 0.17 to 0.22 mm thicknesses on vertical surfaces could not be made using paint formulations taught in the literature.

We discovered that hardfacing paints should have a thixotropy ratio greater than as determined taking the Brookfield viscosity measured at 0.5 rpm spindle rotation and dividing by the viscosity measured at 100 rpm rotation. The viscosity at 100 rpm relates to the high shear rates associated with application of the paint, and the viscosity at 0.5 rpm relates to the viscosity of the coating after application on a substrate. The preferred thixotropy ratio is greater than 50. At these thixotropy levels, tungsten carbide based paints resisted sagging for paint thicknesses up to 0.25 mm.

The minimum viscosity measured at 0.5 rpm rotation preferably is greater than 30,000 centipoises and most preferably greater than 100,000 centipoises in order to hold heavy hardfacing particles in suspension, a requirement for paint stability.

Dispersion of the heavy particles in the paint is achieved through hydraulic shear in combination with grinding aids, wetting agents, and dispersion agents. Grinding aids such as Surfynol 131, made by Air Products, effectively dispersed heavy particles. Grinding aids help with the deagglomeration of hardfacing particles less than 10 to 20 microns during grinding. Though concentration levels up to 2 wt % may be used, it is preferred that less than 1 wt % of the paint be made up of grinding aids. Nonionic surfactants such as Triton X-100, made by Union Carbide, functioned well as surface-tension reducers. A surfactant concentration in the paint of up to 1 wt % is preferred, and less than 0.5% is most preferred. And a defoamer like Surfynol-75, made by Air Products, effectively suppressed foam during mixing. The concentration of defoamer in the paint typically is less than 2 wt %. Paint formulations are not limited to these particular chemicals.

Dispersion is also achieved by means of organic and inorganic dispersant agents, either separately or in combination. Organic dispersants are selected from the group that includes: acrylic copolymers, cross-linked acrylic polymers, alginates, carrageenan, microcrystalline cellulose, methyl cellulose, ethyl cellulose, propyl cellulose, hydroxy derivatives of the cellulose thickeners, guar, guar deratives, low-molecular weight polyethylene, and xanthan gums. Inorganic dispersants are selected from the group: hydrated magnesium aluminum silicates, clays, water-swellable clays, organo clays, sodium silicate, and potassium silicate. The preferred inorganic dispersant is colloidal magnesium aluminum silicate.

Dispersion agents can also function as thickening agents. The criteria for selecting organic dispersants/thickeners are: (1) The thixotropy ratio should be over 30. (2) Maximum concentration preferably is 10 weight %, and less than 5% is most preferred. (3) Minimum viscosity as measured at 0.5 rpm on the Brookfield Viscometer is at least 30,000 centipoises. (4) The preferred materials thermally decompose, leaving little carbon residue. We found that an emulsion of a copolymer of acrylic acid (trade name Acrysol 60 produced by Rohm & Haas) met these requirements. The Acrysol 60 functions both as a dispersant and as an adhesive.

Criteria for selecting inorganic dispersants are: (1) The thixotropy ratio described above should be over 30. (2) Viscosity as measured at 0.5 rpm on the Brookfield Viscometer is at least 30,000 centipoises. (3) The volume of dry inorganic thickener should be less than 10% of the volume of the hard particles.

Adhesives for the paint

Adhesives can be organic and inorganic. Organic adhesives may be water soluble adhesives or emulsions of adhesives in water. Water soluble adhesives may be one or more of the following: acrylates, vinyl acetate, cellulose derivatives such as ethyl cellulose, polyvinyl alcohol, gums, starches, and casein rosin. Emulsion adhesives may be one or more of the following: acrylic acid copolymers, polyvinyl acetate, polyacrylates, neoprene, and styrene butadiene. The concentration of organic adhesives should be less than 10 weight % of the paint, and preferably less than 5%.

Additionally, the weight of the carbon residue after heating to 600 Celsius in an inert atmosphere should be less than about 30% of the dry weight of the adhesive. It is important to minimize the amount of organic materials in the paint, because excess carbon would be deleterious to the subsequent brazing step.

Since clay dispersants have limited adhesive properties, organic adhesives have to be included in the paint formulation.

The adhesive strength on steel of copolymer of acrylic acid (Acrysol 60), hydroxyethyl cellulose, methyl propyl cellulose, boron bonded cellulose, cross-linked polyacrylate, and guar were measured at 20 degrees Celsius and then again at 20 degrees Celsius after heating to 460 Celsius in vacuum for one hour. The Acrysol 60 had the highest strength after having been heated to 460 degrees Celsius. This property of the adhesive is considered important, because one function of the adhesive in the paint is to bond the particles together and to metal substrates during heating to metallurgically bond the metallic components in the paint. Thus, the Acrysol 60 is currently the most preferred adhesive to use in the paint formulation.

Preferred adhesives are organic adhesives that do not leave substantial solids residue when heated to 600° C. in an inert atmosphere. Using the spindle #5 of a Brookfield viscometer, the adhesive should have a Brookfield viscosity of over 200,000 centipoises at 0.5 rpm and under 20,000 centipoises at 100 rpm. This can be achieved by means of a thickening agent for water-based systems. The concentration of thickening agent in combination and any additives to suppress foaming, enhance wettability, or facilitate grinding is adjusted to achieve the viscosity range specified above. Any thickening agent that has the approximate difference between the high shear rate and low shear rate as defined above will suffice as an adhesive, providing that the residue after heating is below that specified. Polymeric acrylate emulsions in water are preferred, though other adhesives that meet the viscosity requirement can be used.

The foregoing description of adhesives that are suitable for use in the paint also applies to adhesives that are applied on their own, with hardfacing particles then dusted onto the adhesive.

Plasticisers such as polypropylene can be used to adjust the Durometer hardness of the adhesive and impart flexibility to dried coatings to permit forming without creating cracks. This is sometimes required to improve the toughness of the painted coating to facilitate handling. Other thickeners such as cellulose-based thickeners for increasing the viscosity of water can be used for making the paints of the present invention. They just have to satisfy the viscosity and residue requirements.

Mixing the Hard Particle Paint

Knowhow for normal paint making is not directly applicable to making paints containing tungsten carbide or other hardfacing particles, because the density of hardfacing particles is over three times greater than that of titanium dioxide and other common pigments. Viscosities of the paint must be increased to high levels, such as over 30,000 centipoises measured in a Brookfield viscometer at 0.5 rpm in order to hold these heavy particles in suspension. At the same time, the paint should have a much lower viscosity at high shear in order to be able to be applied as a paint. To accomplish this, thickening agents such as Rohm & Haas's Acrysol thickeners are preferred. They thicken and function as an adhesive in dried coatings.

A procedure that was developed entailed milling carbide of less than 10 microns with dispersion agents, grinding agents and defoamers. After dispersion, the thickening agent is added to bring the Brookfield viscosity at 0.5 rpm up to over about 50,000 centipoises. A viscosity range of 50,000 to 170,000 centipoises at 0.5 rpm is preferred. The preferred method of converting the milled carbide plus additives into a paint is to use Acrysol 60 as the thickening agent. As received, the viscosity of the Acrysol 60 is low, i.e. below 100 centipoises. Neutralization with ammonia, sodium hydroxide or other bases increases the viscosity. The desired amount of base is added to the ground carbide plus additives. The Acrysol A 60 is then titrated into the mixture as it is agitated in a high-shear mixer to obtain the desired viscosity.

Clay may be one of the additives for dispersing, but it also serves as a thickener.

Coarser particles of tungsten carbide in the range of 10 to about 60 microns can be dispersed by first adding the tungsten carbide to water plus a foaming agent and then thickening it by the above procedure using the Acrysol 60. In addition to a viscosity of over 30,000 centipoises as measured on a Brookfield viscometer at 0.5 rpm, the paints of this invention should have viscosities as measured at 100 rpm which are less than one twentieth of that measured at 0.5 rpm. Typically, the ratio of the viscosity of these carbide-containing paints as measured at 0.5 rpm to that measured at 100 rpm is greater than 30 to 1.

One advantage of this paint-making procedure is that hard particles having densities greater than 10 grams per cubic centimeter and sizes greater than 10 microns can be made into practical paints.

Braze Fillers

The braze filler powder for the paint is selected for its ability to braze the hard particles and for its mechanical properties. Hardfacing alloys are preferred for brazing tungsten and chromium carbide particles. They impart resistance to wear by resisting scouring of braze between hard particles of carbides. The alloys preferably are nickel, cobalt, and/or iron base alloys alloyed with 5 to 30% by weight chromium, 0 to 30% by weight tungsten, 0 to 30% by weight molybdenum, 0.2 to 5% by weight carbon, plus one or more melting-point depressors taken from the group of: boron, silicon, and phosphorous. The concentrations of these minor alloying elements are generally below 12% by weight of the alloy.

For most applications, brazes in which the temperature difference between the solidus and liquidus is less than 5 degrees Celsius are preferred. However, for very severe wear applications, hardfacing alloys, having a difference between the solidus and liquidus of as high as 30 degrees Celsius and higher, may be used. The precipitation of intermetallic hard particles in the hardfacing alloys increases the difference between solidus and liquidus temperatures.

Braze alloys must be able to wick into the admixed hard particles and yet not dissolve them at brazing temperatures. Excessive dissolution of hard particles would lower resistance to wear. During brazing, the braze should dissolve less than 20% of the added hard particles.

Other brazes, such as silver solders, would be acceptable in some applications.

However, their costs are prohibitive for most applications. For producing hard-particle-containing coatings on aluminum, a braze alloy that would melt below the melting point of aluminum would be required. It would also have to be able to wet the hard particles sufficiently to wick into the layer of hard particles. Likewise, to coat other metals such as copper or zinc-based alloys, the braze material would have to have a melting point below the melting point of the substrate metal and wick into the hard-particle powder.

Precipitation of intermetallic phases to increase resistance to wear is desired for brazes that are to be used in the present invention. It is preferred that the brazes have a Rockwell C hardness of over about 50, and over 58 is most preferred.

Brazes are formulated into paints by the same procedures used for formulating hard particles into paints.

To make the braze paint using an acrysol emulsion such as Acrysol 60 along with ammonia or some other base in the desired amount, the braze powder is first added to a mixer 4a and is mixed in a slurry with the base. Acrysol 60 is then slowly titrated into the slurry to bring the viscosity up to over about 50,000 centipoises. The reaction of the base with the Acrysol 60 increases the viscosity of the paint.

In the practice of this invention, when a hard particle layer and a braze layer are applied as separate layers, it is not necessary for the braze layer to be applied as a paint. After applying the layer (or layers) of hard particles, the braze layer could alternatively be applied as a cloth of the type described in U.S. Pat. No. 3,743,556, which is hereby incorporated by reference, or a commercial braze paste could be used. Nor is it necessary that the layer of carbide particles be completely covered by the braze layer. We discovered that molten braze alloy will wick into areas of carbide not covered by the braze alloy layer. The preferred practice is to overlay substantially all of the layer of hard particles with the layer of braze.

Substrates

The substrates or parts 5 to be coated by this process can be alloys based upon iron, copper, zinc, nickel, cobalt, aluminum, or any of the refractory metals. As specified above, the braze alloy used to bond hard particles to the part must have a melting point below that of the part and be able to metallurgically bond the hard particles to the substrate. To do this, the braze has to wet both the hard particles and the substrate.

Surface Preparation

Surfaces of parts to be coated should be prepared in accordance with best practices for brazing. Typically, this is accomplished by first washing parts to remove oils, soils, and other loose contaminates. Next, surfaces to be coated are grit blasted to remove oxides and imbedded contaminates. Finally, the surface typically is wiped or washed again with a corrosion inhibitor to remove grit-blasting dust.

Application of Hard Particle Paint

The hard particle paint is applied to the area of the part to be coated in step 7. This can be accomplished by spraying, brush painting, trowelling, dipping, rolling or any other means for applying viscous liquids to surfaces. Spraying is preferred because of the uniformity of layers of paint that can be applied. If the paint is applied by spraying, paint sprayers capable of spraying high-viscosity liquids should be used.

While the thickness of the hard particle layer typically is 0.25 mm (0.01 inches) or less, coatings up to 6 mm and over can be made. Thicker layers will require multiple applications of hard particle paint. They should be partially or completely dried between applications, though this is not an essential requirement. This is indicated by the reverse arrows between steps 7 and 8.

Paint is applied to the inside diameters of cylinders by spraying while the cylinder is rotated. This is accomplished by inserting a tube with a nozzle on the end and injecting the paint as the nozzle is withdrawn. Alternatively, the paint can be added through multiple ports along the length of a tube inserted into the cylinder.

Drying

Drying to remove water between applications of hard particle or braze paint and before heating must be done relative slowly. If it is done too rapidly, water vapor will be generated at rates that will create vent holes in the coating.

Any method of heating that will not be too rapid or raise parts above the boiling point of water is acceptable. For example, paint on the inside of cylinders may be dried by blowing air through the cylinders.

Compaction

Layers of particles formed by paints or by applying hard particles over an adhesive layer are inherently porous. There is residual porosity occurring from void space between particles with closest packing. Additionally, void space is created when the water or other carrier liquid evaporates in the drying steps 8 and 11. Some of the water-induced porosity is removed by shrinkage. For maximum resistance to wear, the hard particles should have closest packing. Thus, for those applications requiring maximum resistance to wear, the dried paint optionally may be compacted to remove water-induced voids. Any method of compaction that does not damage the hard particle layer is acceptable. For simple geometries such as flat plates, mechanical pressing with a hydraulic press may be used. For cylindrical shapes, pressures needed for compaction may be obtained by rolling. Another means for applying mechanical pressure is by shot peening. The size of the shot and velocity have to be adjusted to avoid damaging the layer of particles being compacted.

Application of Braze Paint

If a paint layer containing braze powders is used on top of the hard particle layer, any of the methods for applying liquids as coatings described for applying the hard particle paint can be used. The amount of braze applied is critical. If too much braze is applied, molten braze will wash the carbide particles off of vertical surfaces. If insufficient braze is applied, shrinkage cracks are formed. It has been found that the amount of braze should be what is required to fill the voids between the hard particles plus 10% excess to wet the base metal.

Brazing

Heating to braze hard particle powders to each other and to the substrate should be done within the following constraints: First, the atmosphere during heating must not form oxides, nitrides, or other compounds that would inhibit infiltration of molten braze into the carbide particles. Secondly, heating during the period of decomposition of the organic adhesive must be done at a rate that will not disrupt the layer of carbide particles. Very rapid heating will "blow" both braze and carbide particles away from the surfaces being coated. Third, maximum temperatures must be above the melting point of the braze alloy in the range where the viscosity of the molten braze alloy is low enough to wick into the small interstices between carbide particles. Finally, rates of heating or cooling must be adjusted to minimize distortion of the parts.

Brazing of a long pipe that has had its inside diameter coated as described in steps 1–11 can be accomplished by using an induction coil. The inside of the pipe should be purged with argon or some other inert atmosphere in the case of brazes that are susceptible to oxidation. Coating is improved by rotating the pipe as it passes through the induction coil at a high enough rate to generate a centrifugal force of at least one times the force of gravity.

Hardfacing Coating

Coatings produced by one of the above-described processes are composite structures in which particles of hard particles are in a matrix of the braze alloy metallurgically bonded to the substrate. Hardface coatings produced by these processes are of two types. One is a composite of admixed hard particles dispersed in a hard alloy. The other is a hard alloy coating without admixed hard particles. The alloy coating without admixed hard particles includes a dispersion of precipitated hard intermetallic compounds, which themselves are hard particles. Both types of coatings are metallurgically bonded to the substrates being protected. Both types of coatings can have a Rockwell C hardness of over about 50, while over Rockwell C 60 is preferred for most applications. Composite coatings with admixed hard particles are more resistant to wear by sand abrasion than hard alloy coatings without admixed hard particles.

The resulting coatings are substantially free of porosity. The concentration of hard particles in the composite is controlled by the sizing of added hard particles, the ratio of hard particles to adhesive, and the amount of compaction of the hard particle layer after application. These are adjusted to obtain the desired hardness and hence the desired degree of resistance to wear.

After the heating step, the parts may be used directly or may be machined or ground to satisfy specified dimensions and surface finishes.

Single-Layer Process

Many of the paint-based and adhesive-based hardfacing processes described above involve the application of a layer of braze over a layer of hard particles. However, it is also possible to apply both braze and hard particles in a single layer of paint.

A single layer of paint containing a mixture of 325 mesh tungsten carbide powder with sharp-melting point eutectic NiCr/B braze (Wall Colomony Nicrobraze 150, having a melting range of 0 degrees Celsius) resulted in a porous coating that intrinsically had very low resistance to wear. The ratio of the volume of braze in the paint to the volume of tungsten carbide was 1.1 to 1.

We discovered that porosity could be significantly reduced through the use of a broad-melting point alloy like Deloro 45 that melts over a range of 210 degrees Celsius. (Deloro 45 made by Stellite is a nickel-base alloy containing 7.5% chromium, 0.3% carbon, 1.5 % iron, and 1.5% boron) A broad-melting alloy is defined as one with the temperature difference between the liquidus and solidus being greater than 20 degrees Celsius. Substantially pore free metallurgically fused coatings were produced by heating Deloro 45 to 1190 degrees Celsius in hydrogen with a dew point less than minus 60 degrees Celsius. This is between its solidus and liquidus.

While braze powders having a melting range less than 20 degrees Celsius can be used in the single-layer process, braze powders having melting ranges greater than 20 degrees Celsius are preferred. Further, their viscosities at brazing temperature are preferred to be less than about 1,000 centiposes during brazing. In addition, the wettability of the materials of the hard particles by the molten braze as measured by the Sessile drop method should be less than 20 degrees. The Sessile drop method is defined in the McGraw-Hill Dictionary of Scientific and Technical Terms, which definition is hereby incorporated by reference.

The volume ratio of the braze to the added hard particles within a combination braze/admixed hard particle paint may vary from a ratio of 9 to 1 to a ratio of 0.9 to 1. For higher resistance to wear, a ratio of greater than 1.3 to 1 is preferred.

While the work was done with a paint mixture, a hardfacing coating alternatively could be obtained by incorporating a mixture of hard particles and a broad-melting-range braze in cloth. The selection of braze alloy and the ratio of braze alloy to hard particles would be the same as those specified for paint.

EXAMPLES

Example 1

This is an example of applying a layer of tungsten carbide by means of a paint and then applying a layer of braze by sprinkling the braze particles onto an adhesive layer over the paint. A type 316 stainless shield used to protect fans was coated by the following procedure. The fans being protected were those moving flue gases in coal-fired power plants. The shields were 1346 millimeters (mm) long and bent to fit over the leading edge of a fan blade. A paint was made by first mixing 3340 milliliters (ml) of water with 500 ml of Acrysol ASE-60 manufactured by Rohm & Haas. Five-percent by weight ammonium hydroxide solution in water was slowly stirred into this mixture to increase the viscosity. Then, 9 kilograms of tungsten carbide that had a particle size distribution from two to ten microns was blended into the water thickened with the ASE-60. This was blended with a high shear mixer for ten minutes to break up clusters of tungsten carbide. The viscosity of the paint thus formulated as measured with a Model DV-II+ Brookfield viscometer was 464,000 centipoises at 0.5 revolutions per minute (rpm) and 8280 centipoises at 100 rpm. The paint was sprayed on the sides of the protective shield with an airless Graco Senator spraying system to a depth of 0.2 mm. This was air dried.

An adhesive was made by mixing 3340 ml of water with 500 ml of ASE-60 and 170 ml of five-percent ammonium hydroxide. Its viscosity was 176,000 centipoises at 0.5 rpm and 2560 centipoises at 100 rpm using a # 7 spindle. This was sprayed over the layer of tungsten carbide paint to a depth of approximately 0.1 mm. Immediately, the surface of the protective shield was passed through a falling stream of a nickel/chromium/boron eutectic braze alloy. The particle size of the braze applied was between 44 and 105 microns. The particles adhered to the adhesive, thus forming a layer of braze alloy in juxtaposition with the layer of tungsten carbide.

The shield was weighed before application of the carbide layer and weighed again after application of tungsten carbide. From this, a weight of the layer of tungsten carbide was calculated. The shield was weighed again after application of the layer of braze powder. The weight of the layer of braze powder was determined by the difference of the two weights. Another layer of adhesive and braze powder was applied to bring the ratio of the weight of the braze powder to the weight of the tungsten carbide up to 1.4 to 1.

After drying, the protective shield was placed in a vacuum furnace that reduced air pressure down into the range of ten to the minus four Torr. It was heated at the rate of 350° Celsius per hour to 980° C. and held one hour. Then the temperature was increased at the rate of 180° C. per hour to 1120° Celsius. It was held there for 30 minutes and then cooled to room temperature. Metallographic examination of a polished cross section of the shield revealed that it had a pore-free coating made up of carbide particles metallurgically bonded to each other and to the shield. The coating thickness was 0.1 mm.

Example 2

This is an example of using an alternative embodiment of the invention, in which the wet adhesive is applied to the substrate and then hard particle powder is applied to the adhesive. Both a layer of hard particles and a layer of braze particles were applied in this manner. A coupon of type 4140 steel 25.4 mm×76.2 mm×63.5 mm was coated in the following manner: An adhesive was made by mixing 1550 ml of water with 8 ml solution of SAG 10 antifoaming agent (made by WITCO Corporation), 360 ml of ASE-60 acrylate thickening agent, and 24 ml propylene glycol plasticizer. Sixty ml of a solution of 5% by weight ammonium hydroxide in water was slowly stirred into this mixture. The viscosity as measured with the Brookfield viscometer using a # 3 spindle at 20 rpm was 750 centipoises.

The steel coupon was sprayed with the adhesive to a film thickness of approximately 0.05 mm. An air spraying system made by Spraying Systems, Inc. was used. The coupon was immediately submerged in a fluidized bed of minus 44 micron size particles of tungsten carbide. The carbide had been prepared by crushing tungsten carbide bonded with 6% cobalt. The resulting layer of carbide was 0.07 to 0.1 mm thick. We found that the thickness of layers of tungsten carbide could be precisely adjusted through controlling the thickness of the adhesive layer. Thicker layers could be made by multiple application of layers of adhesive and carbide.

After drying, the layer of tungsten carbide particles on the coupon was spray coated with the adhesive. The coupon was then submerged in a fluidized bed of Ni/Cr/B eutectic braze alloy with particles 44 to 105 microns in size. Particles of braze adhered to the adhesive, thus forming a layer of braze particles in juxtaposition with the layer of carbide particles. By adjusting the thickness of the layer of adhesive and the number of applications, the amount of braze alloy applied was adjusted to give a ratio of 0.7 parts by weight of braze alloy to 1 part by weight of carbide in the coating. The weighing method described in Example 1 was used to determine the weight of the carbide layer and the amount of braze to add.

The coated coupons were heated at a rate of 350° Celsius per hour to 1080° C. and held one hour. Then the temperature was increased at a rate of 180° C. per hour to 1100° Celsius. It was held there for 30 minutes and then cooled to room temperature. The result was a layer of particles of tungsten carbide brazed to each other and to the steel coupon. The coating thickness was 0.5 mm.

The thickness of layers of powder applied by the above described processes are controlled by the viscosity of the adhesive and the thickness of the layer of adhesive applied before dry powder contacts the adhesive layer. Viscosities of adhesives over 200,000 poises will make thicker coatings than adhesives 10,000 to 50,000 centipoises.

Higher viscosity adhesives allow larger-size particles to be incorporated into coatings.

Coating vertical surfaces with tungsten carbide with sizes over 100 microns generally requires adhesives with viscosities greater than 200,000 centipoises. The selection of viscosities of adhesive is made based upon the density and size of the hard particles and the desired thickness of the coating.

This method of forming coatings by applying dry powder to surfaces wetted by adhesive can be used to make coatings of hardfacing alloys or coatings of other particulate materials.

Example 3

This is another example of applying layers of adhesive and dry particles. In this case, the particles are applied by means of dry spraying. A coupon of type 4140 steel 25.4 mm×76.2 mm×63.5 mm was coated in the following manner: An adhesive was made by mixing 1550 ml of water with 8 ml solution of SAG 10 antifoaming agent (made by WITCO Corporation), 360 ml of ASE-60 acrylate thickening agent, and 24 ml propylene glycol plasticizer. Sixty ml of a solution of 5% by weight ammonium hydroxide in water was slowly stirred into this mixture. The viscosity as measured with the Brookfield viscometer using a # 3 spindle at 20 rpm was 750 centipoises.

The steel coupon was sprayed with the adhesive to a film thickness of approximately 0.05 mm. An air spraying system made by Spraying Systems, Inc. was used. The coupon was immediately sprayed with a dry powder of tungsten carbide with a particle size range of 10 to 44 microns. The carbide had been prepared by crushing tungsten carbide bonded with 6% cobalt. The resulting layer of carbide was 0.07 to 0.1 mm thick. We found that the thickness of layers of tungsten carbide could be precisely adjusted through controlling the thickness of the adhesive layer. A thicker hard particle layer could be made by multiple application of layers of adhesive and carbide.

After drying, the layer of tungsten carbide particles on the coupon was spray coated with the adhesive. The coupon was then dry sprayed with Ni/Cr/B eutectic braze alloy with particles 44 to 105 microns in size. Particles of braze adhered to the adhesive, thus forming a layer of braze particles in juxtaposition with the layer of carbide particles. By adjusting the thickness of the layer of adhesive and the number of applications, the amount of braze alloy applied was adjusted to give a ratio of 0.7 parts by weight of braze alloy to 1 part by weight of carbide in the coating. The weighing method described in Example 1 was used to determine the weight of the carbide layer and the amount of braze to add.

The coated coupons were heated at the rate of 3500 Celsius per hour to 1080° C. and held one hour. Then the temperature was increased at the rate of 180° C. per hour to 1100° Celsius. It was held there for 30 minutes and then cooled to room temperature. The result was a layer of tungsten carbide particles 1 mm thick brazed to each other and to the steel coupon.

Example 4

This example demonstrates building up thick coatings of tungsten carbide by repeated applications of adhesive and dry powder. A coupon of type 4140 steel 25.4 mm×76.2 mm×63.5 mm was coated in the following manner: An adhesive was made by mixing 1550 ml of water with 8 ml solution of SAG 10 antifoaming agent (made by WITCO Corporation), 360 ml of ASE-60 acrylate thickening agent, and 24 ml propylene glycol plasticizer. Sixty ml of a solution of 5% by weight of ammonium hydroxide in water were slowly stirred into this mixture. The viscosity as measured with the Brookfield viscometer using a # 3 spindle at 20 rpm was 750 centipoises.

The steel coupon was sprayed with the adhesive to a film thickness of approximately 0.05 mm. An air spraying system made by Spraying Systems, Inc. was used. The coupon was immediately sprayed with a dry powder of tungsten carbide with a particle size range of 100 to 200 microns. The carbide had been prepared by crushing tungsten carbide bonded with 6% cobalt. The layer of carbide was 0.07 to 0.1 mm thick. This was allowed to dry to increase the strength of the coating. Then another layer of adhesive was applied and again carbide particles were applied to the wet adhesive. This was repeated until the thickness of the layer of carbide particles was increased to 4.5 mm.

After drying, the layer of tungsten carbide particles on the coupon was spray coated with the adhesive. The coupon was then dry sprayed with Ni/Cr/B eutectic braze alloy with particles 44 to 105 microns in size. The adhesive in the layer of braze was allowed to dry and the process was repeated until the desired amount of braze was applied. This was a ratio of 0.7 parts by weight of braze alloy to 1 part by weight of carbide in the coating. The weighing method described in Example 1 was used to determine the weight of the carbide layers and the amount of braze to add.

The coated coupons were heated at the rate of 350° Celsius per hour to 1080° C. and held one hour. Then the temperature was increased at the rate of 180° C. per hour to 1100° Celsius. It was held there for 30 minutes and then cooled to room temperature. The result was a layer of tungsten carbide particles 4.5 mm thick brazed to each other and to the steel coupon.

If a higher-viscosity adhesive had been used, the thickness of each layer of carbide and braze particles would have been larger, which would have reduced the number of layers needed to make a coating 4.5 mm thick. When coating the upper sides of flat-horizontal surfaces, coatings 4.5 mm thick and over can be made in one application of powder.

This example demonstrates the feasibility of coating large flat sheets of steel or other metals by a continuous process using the following sequences: (1) Sheet horizontally oriented moves beneath sprayers that apply a layer of adhesive. (2) From 1, the sheet moves beneath sprayers that apply the desired amount of tungsten carbide powder. (3) From 2, the sheet moves beneath sprayers that apply adhesive over the tungsten carbide. (4) From 3, the sheet moves beneath sprayers that apply the desired amount of nickel/chromium braze alloy over the carbide layer. (5) From 4, the sheet moves through an open-ended hydrogen sintering furnace that melts the braze, thus forming a metallurgically bonded composite of tungsten carbide and braze on the top surface of a steel sheet. (6) From 5, the hardfaced sheet passes through straightening rolls. (7) From 6, the sheet is cut to final dimensions. If sheets are precut in step 1, then this step is not needed. Depending upon the thickness of the coating relative to the thickness of the substrate, straightening rolls may not be needed.

Example 5

This example demonstrates a method for coating the inside of heat exchangers by the dry-powder method of application. While this test was run to apply a braze powder, the same application method should work at least as well for applying carbide powder, thereby providing a technique for applying a carbide coating to complex shapes that are not in the line of sight of a paint sprayer. A heat exchanger was simulated by connecting six 8-inch sections of ¾ inch water pipe into three U-sections using 90-degree elbows. These were then connected in series to form a long channel that reversed direction five times. As air was blowing through the assembly, the adhesive described in Example 3 was injected into the air stream. Then, the adhesive injection was turned off and minus 44 micron Ni/Cr/B eutectic braze powder was injected into the air stream. Injection of braze powder was stopped and air was allow to flow for another 10 minutes to dry the adhesive. Disassembly of the simulated heat exchanger revealed that a coating of braze powder had been deposited throughout the inside surfaces of the entire length of the assembly.

Example 6

This is an example of making a tungsten carbide coating using first a layer of tungsten carbide paint followed by a layer of braze paint. The tungsten carbide paint contains tungsten carbide particles less than 10 microns in diameter having a mean of 6 microns. The hard particle (in this case tungsten carbide) paint was made first by mixing 2000 milliliters (ml) of water, 35 grams of Tamol 165 grinding aid made by Rohm & Haas, 35 grams of Triton 100 wetting agent made by Union Carbide, 10 grams of Dow 62 antifoamer made by Dow Corning, and 8000 grams of two to five micron tungsten carbide made by Teledyne. This was ground in an attritor for two hours. The resulting mixture was thickened by adding 110 ml a solution of 5% by weight ammonia in water and then titrating in 160 ml of Acrysol 60 made by Rohm & Haas.

Braze paint was made by first mixing 2000 ml of water with 10 grams of Dow 62 defoamer, 100 ml of 5% ammonia, and 7000 grams of minus 325 mesh Nicrobraze 150 Ni/Cr/B eutectic made by Wall Colmonoy. While being stirred, 150 ml of Acrysol 60 thickening agent was titrated into the mixture.

A layer of the carbide paint 0.5 millimeters thick was applied to a bar screen substrate made of 316 stainless steel. Then, a layer of braze paint 0.5 millimeters thick was applied. The coated substrate was then heated in a high-vacuum furnace at 1120° Celsius for 30 minutes to allow the braze and hard particles to fuse with each other and with the substrate.

Metallographic examination revealed that the tungsten carbide particles that had been dispersed in the paint had consolidated into dense pore-free packing with one particle diameter spacing between particles.

Example 7

This example uses the two-layer paint process for coating the inside diameters of pipe. Carbide paint was made by first mixing 2,000 ml of water, 60 grams of Surfynol 75 made by Air Products, Inc., 72 ml of a solution of 5% by weight ammonia in water, and 12,000 grams of tungsten carbide with a mean size of 35 microns containing 6% by weight cobalt. Then, 80 ml of Acrysol 60 thickening agent made by Rohm & Haas, Inc was titrated into the mixture as it was being stirred. The viscosity is approximately 90,000 centipoises as measured with a Brookfield viscometer rotating at 0.5 rpm.

Braze paint was made by mixing 2,000 ml water with 25 grams of Surfynol 75 and 55 ml of 5% ammonia plus 7500 grams of a nickel/chromium/boron eutectic braze alloy. Then, with stirring, 75 ml of Acrysol 60 was titrated into the mixture. The resulting viscosity was approximately 60,000 centipoises as measured with a Brookfield viscometer rotating at 0.5 rpm.

A 3-inch diameter steel tube four feet long was cleaned and mounted in an apparatus that rotated the pipe at 600 revolutions per minute (rpm). It permitted access to one end of the pipe. The inside of the pipe was coated with a layer of tungsten carbide paint that would result in a layer of carbide particles 0.020 inch thick when dried. This was accomplished by inserting a tube in the open end of the pipe and pumping the carbide through openings in the end of the tube at a constant rate as the tube was withdrawn at a constant rate. Using the same procedure, a layer of braze paint was applied over the layer of carbide paint by the same method. Its thickness was adjusted to produce a layer of braze particles of the same thickness as the layer of carbide particles. The layers of paint were dried by blowing air through the pipe as it was rotating. The inside of the pipe was loose filled with aluminate silicate high-temperature insulating material to eliminate convective heat loss during brazing.

The pipe was placed in another apparatus that: (1) passed argon through the pipe, (2) rotated the pipe, and (3) traversed an induction heating coil along the length of the pipe. The pipe with inside surfaces being coated with dried paint was purged with over 20 volumes of argon as the pipe was rotated at 900 rpm. The induction coil was energized to increase the temperature of the pipe, as measured by an optical pyrometer, to 200 degrees above the liquidus of the braze alloy. At that temperature, the coil was caused to transverse the pipe at 1.7 inches per minute.

The resulting coating was densely compacted particles of tungsten carbide metallurgically bonded to the steel pipe. Volume percent of particles of tungsten carbide was over 70%. The variation of the thickness of the coating inside of the pipe was less than 10% around the circumference.

Example 8

The purpose of this example is to show that the disclosed paint process can be used to hardface the inside surfaces of pipe with hardfacing alloys. A hardfacing braze alloy paint was made by mixing 2,000 ml water with 25 grams of Surfynol 75 and 55 ml of 5% by weight ammonia in water plus 7500 grams of Colmonoy 6, a nickel/chromium base hardfacing alloy made by the Wall Colmonoy Corporation. The powder was minus 140 mesh with a mean diameter of about 150 microns. Then, with stirring, 75 ml of Acrysol 60 was titrated into the mixture. The viscosity of the resulting braze paint was approximately 60,000 centipoises as measured with a Brookfield viscometer rotating at 0.5 rpm. At 100 rpm the viscosity was 1000 centipoises.

A 3-inch diameter steel tube four feet long was cleaned and mounted in an apparatus that rotated the pipe at 600 revolutions per minute (rpm). It permitted access to one end of the pipe. The inside of the pipe was coated with a layer of the paint that would result in a layer 0.040 inch thick when dried. This was accomplished by inserting a tube in the open of the pipe and pumping the hardfacing paint through the openings in the end of the tube at a constant rate as the tube was withdrawn at a constant rate. The paint was dried by blowing air through the pipe as it was rotating. The inside of the pipe was loose filled with aluminate silicate high-temperature insulating material to eliminate convective heat loss during brazing.

The pipe was placed in another apparatus that: (1) passed argon through the pipe, (2) rotated the pipe, and (3) traversed an induction heating coil along the length of the pipe. The pipe with inside surfaces being coated with dried paint was purged with over 20 volumes of argon as the pipe was rotated at 900 rpm. The induction coil was energized to increase the temperature of the pipe, as measured by an optical pyrometer, to 100 degrees above the liquidus of the hardfacing alloy. At that temperature, the coil was caused to transverse the pipe at 1.7 inches per minute. The pipe was then cooled and the insulation removed.

The result was a uniform coating of Colmonoy 6 hardfacing 0.02 inches thick over the inside surface of the pipe that had been hot enough to melt the hardfacing alloy.

Example 9

The purpose of this example is to show that hardfacing alloy coatings of relatively uniform thickness can be made by dipping parts into suspensions of hardfacing alloy powders. Two grams of Air Products Sulfynol 75 antifoam agent plus 1048 grams of minus 325 mesh Ni/Cr/B eutectic alloy plus 53 grams of Acrysol 60 suspension agent were stirred into 300 grams of water. The Acrysol 60 is 28% solids and the balance is water. The Acrysol 60 was partially neutralized by adding 5.3 grams of triethanolamine to adjust the pH to 7.7. This amount partially neutralized the Acrysol 60. This resulted in a viscosity of 100,000 centipoises at 0.5 rpm as measured on a Brookfield viscometer. At 100 rpm, the viscosity was 1700. Strips of steel 1 inch wide by ⅛ inch thick by 12 inches long were submerged in the above describe suspension, were rapidly withdrawn, and then were allowed to dry. The coating was 0.01 inches (0.254 mm) thick at the top and 0.0106 inches (0.269 mm) thick at the bottom. The 6% difference in thickness from top to bottom is acceptable for most hardfacing coatings. Steel that was slowly withdrawn had a difference of 18% of coating thickness between the top and bottom. Strips coated by this process were heated above the solidus temperature of the Ni/Cr/B alloy in a hydrogen atmosphere to form a hard surface.

Example 10

This example demonstrates the process of increasing the viscosity of paint after application as a coating; hereafter referred to as "in situ thickening". Paint made by the procedure given in example 9 was partially neutralized to a pH of 6 with triethanol amine to achieve a Brookfield viscosity of 60,000 centipoises at 0.5 rpm. At 100 rpm, the viscosity was 1,100 centipoises. Triethanol amine was sprayed onto a strip of steel with the same dimensions as those given in example 9, and the strip was then submerged in the paint for 5 minutes. This raised the pH of the layer of paint adjacent to the steel to above 7 which increased its low-shear viscosity (0.5 rpm) to over 500,000 centipoises. It was then rapidly withdrawn and sprayed with triethanol amine. It was then placed in a horizontal position and allowed to dry. No dripping or sagging occurred.

Lack of dripping in this example was due to the increase in viscosity of the paint caused by the triethanol amine at the coating-steel interface and at the coating-air interface. Strips coated by this process were then heated above the solidus temperature of the Ni/Cr/B alloy in a hydrogen atmosphere to form a hard surface.

Any chemically basic material capable of neutralizing the acid groups in the Acrysol 60 could be used for increasing the paint viscosity. This could be alkali hydroxides, lime, organic amines, or any other basic material. Also, any agent whose viscosity increased with pH could be used as a thickening agent in place of the Acrysol 60 for making the paint of this example.

Example 11

Example 8 was repeated in every respect except that Colmonoy 88 was used instead of Colmonoy 6.

The result was a uniform coating of Colmonoy 88 hardfacing 0.02 inches thick over the inside surface of the pipe that had been hot enough to melt the hardfacing alloy. The coating was superior to Colmonoy 6 in that the Colmonoy 88-coated pipe could be hot bent above 950 Celsius; whereas the Colmonoy 6 coating formed many cracks during bending under the same conditions.

Example 12

The purpose of this example is to show the application of paints on flat surfaces by spin casting. The paint was made by high-shear mixing of the following ingredients: 500 ml of water, 23 grams of Air Products Surfynol CT 131 dispersant, 2 grams of Air Products Surfynol 420 surfactant, 15 grams Air Products Surfynol 75 foam suppressant, 2,447 grams of minus 325 mesh cobalt-bonded tungsten carbide, 612 grams of 2 to 5 micron tungsten carbide, 14.2 grams of smectite clay, and 36 grams of Rohm & Haas Acrysol -60. This was neutralized to a pH of 7 with 11 grams of potassium hydroxide. The viscosity of the resultant paint had a Brookfield viscosity at 0.5 rpm spindle rotation of 367,000 centipoises and a viscosity at 100 rpm of 5,150. The thixotropy ratio was 71.

A layer of paint was applied to the side of a 330 mm diameter concrete saw blade by the following procedure: While the blade was rotating at 16 rpm in the horizontal plane, paint was slowly poured onto the upper surface 75 mm in from the periphery. Centrifugal force uniformly distributed a layer of wet paint 0.4 mm thick over the annulus of the saw blade formed by an inner diameter 180 mm and the outer diameter of 330 mm. After drying, the coating was 0.2 mm thick. A second layer was then applied to give a resulting layer of tungsten carbide particles 0.4 mm thick.

Using the spin coating procedure, a layer of eutectic Ni/Cr/B braze paint made by the procedure given in Example 7 was then applied over the layer of tungsten carbide particles. Through repeated applications, the thickness of the dried braze coating was increased to 0.4 mm. The other side of the saw blade was coated with 0.4 mm layers of tungsten carbide particles and Ni/Cr/B particles by the same procedure.

Using a flat-end chisel, radial grooves every 20 degrees were cut through the layers of carbide and braze on both sides of the saw blade.

The layers of carbide and braze powders were then fused by the following procedure: A layer of refractory alumina silicate cloth on the hearth of a vacuum furnace horizontally was used to support the saw blade. Over the saw blade was placed another layer of refractory cloth. Pressure was applied with a 12.7 mm thick plate of graphite. The assembly was heated to 1340° Celsius in vacuum.

This overall procedure produced a metallurgically bonded composite of tungsten carbide in a matrix of a eutectic Ni/Cr/B 0.4 mm thick in the pattern of the material that was left behind after scribing the surface of the saw blade.

Example 13

The purpose of this example is to demonstrate in situ thickening of paint coatings using paint in which an inorganic clay is the dispersant and an organic material is used for adhesion and post thickening. The paint was made by high-shear mixing of the following ingredients: 500 ml of water, 23 grams of Air Products Surfynol CT 131 dispersant, 2 grams of Air Products Surfynol 420 surfactant, 15 grams Air Products Surfynol 75 foam suppressant, 2,447 grams of minus 325 mesh cobalt-bonded tungsten carbide, 612 grams of 2 to 5 micron tungsten carbide, 28.2 grams of smectite clay, and 36 grams of Rohm & Haas Acrysol 60. The paint was not neutralized. The resultant paint had a Brookfield viscosity at 0.5 rpm spindle rotation of 320,000 centipoises and a viscosity at 100 rpm of 34,000 centipoises.

A 15% by weight solution of potassium hydroxide in water was sprayed onto a strip of steel 1×12×⅛ inches. The strip was then submerged in the paint for 5 minutes. This raised the pH of the layer of paint adjacent to the steel to above 7 which increased its low-shear viscosity (0.5 rpm) to over 1.4 million centipoises. It was then rapidly withdrawn and allowed to dry in a vertical position. The coating thickness was 1.9 mm. (Dip coating without in situ thickening resulted in a coating thickness of 0.3 mm.) This clearly demonstrates the phenomena of in situ thickening to increase the thickness of coatings by application of dipping, spraying, and other means for applying coatings.

Applications

Wear-resistant coatings produced as described above can be used for making metallurgically bonded, fully dense, oxide free hard coatings on metal surfaces. An area of use for such coatings is fluid-handling equipment subject to wear by abrasive material in the fluid being handled. This encompasses fans, protective shields for fans, pumps, valves, pipes, elbows, flues, abrasive blasting equipment, impellers for mixing, propellers for boats, turbine blades, etc. The process can provide protection against wear in another type of equipment used in forming or cutting operations. This includes extruder barrels, extruder screws, forming rolls, shear bars, cutting tools, wood and plastic chippers, drill bits for well drilling, ceramic and metal-forming tooling, extruding dies, drill bits, etc. The process can produce coatings that protect sliding or rolling surfaces in machinery. They include bearings and shafts, metal seals, wheels, piston rings and cylinder walls, etc. Another area of application for the process is providing wear protection for equipment that handles or processes solids such as: screens, crushers, grinders, earth plows, conveyors, chutes, deflectors, etc. The process is amenable to coating flat steel and other flat stock that can be post formed to make articles of manufacture like chutes, cones, and other configurations. The applicability of the process is not limited to the uses listed above.

While several different embodiments of the invention have been described above, the invention is not limited to these examples. It will be obvious to those skilled in the art that many other embodiments and variations could be made without departing from the scope of the present invention.

What is claimed is:

1. A paint for forming a hardfacing surface on a metal substrate, comprising:
    metallic hardfacing particles dispersed in water containing less than 10% by weight organic thickening agent;
    wherein the metallic hardfacing particles are selected from the group consisting of: tungsten carbide, cobalt-bonded tungsten carbide, nickel-bonded tungsten carbide, chromium carbide, nickel-bonded chromium, cobalt-bonded chromium carbide, tantalum carbide, niobium carbide, vanadium carbide, and nickel-chrome hardfacing alloys containing boron or silicon for melting point reduction and iron, molybdenum, tungsten, manganese, carbon or combinations thereof for obtaining the desired mechanical properties, wherein said hard particles have a Rockwell C hardness greater than 50; and
    wherein the viscosity of the paint is greater than 50,000 centipoises at 0.5 rpm as measured with a Brookfield viscometer, and the ratio of the viscosity measured at 0.5 rpm to the viscosity measured at 100 rpm is greater than 20 to 1.

2. A paint as recited in claim 1, wherein the organic thickening agent is an acid containing cross-linked acrylic emulsion copolymer.

3. A paint as recited in claim 1, in which the mean size of the hard particles is greater than 30 microns.

4. A paint as recited in claim 1, wherein the hard particles are tungsten carbide.

5. A paint as recited in claim 1, wherein the mean size of the hard particles is less than 20 microns.

6. A paint as recited in claim 1, wherein the mean size of the hard particles is from 1 to 5000 microns.

7. A paint as recited in claim 1, in which large and small hard particles are present in the ratio of over 6 parts by weight large particles to less than 4 parts by weight small particles, and the ratio of the size of the large particles to that of the small particles is greater than 8 to 1.

8. A paint as recited in claim 1, in which the hard particles include particles sized larger than 1000 microns.

9. A paint as recited in claim 1, including an inorganic dispersant selected from the group: hydrated magnesium aluminum silicates, clays, water-swellable clays, organo clays, sodium silicate, and potassium silicate.

10. A paint as recited in claim 9, wherein the inorganic dispersant is colloidal magnesium aluminum silicate.

11. A paint for use in hardfacing a metal substrate, comprising:
    metallic hardfacing particles having a density of greater than 10 grams per cubic centimeter and a Vickers hardness of at least 1000 dispersed in water containing less than 10% by weight organic thickening agent.

12. A paint as recited in claim 11, wherein the viscosity of the paint is greater than 50,000 centipoises at 0.5 rpm as measured with a Brookfield viscometer, and the ratio of the viscosity measured at 0.5 rpm to the viscosity measured at 100 rpm is greater than 20 to 1.

13. A paint as recited in claim 11, wherein the thickening agent is an acid containing cross-linked acrylic emulsion copolymer.

14. A paint as recited in claim 11, wherein the paint also includes an inorganic dispersing agent in which the ratio of the volume of hard particles to inorganic dispersing agent is greater than 20 to 1.

15. A paint as recited in claim 12, wherein the thickening agent is an acid containing cross-linked acrylic emulsion copolymer.

16. A process for producing wear resistant coatings on the surface of a metal substrate, comprising the steps of:
    a. first, applying a layer of paint having a dispersion of hard particles onto the surface;
    b. then, placing over said paint layer a layer of braze alloy that in its molten state will wet the metal substrate and the hard particles;
    c. then, heating said substrate and hard-particle paint layer and braze alloy layer to a temperature above the liquidus of the braze alloy but below the solidus of the substrate; and then
    d. cooling the coated substrate to ambient temperature.

17. A process for producing wear-resistant coatings as recited in claim 16, in which the metal substrate is an alloy of iron, nickel, cobalt, aluminum, copper, or the refractory metals selected from the group consisting of tungsten, molybdenum, niobium, uranium, titanium, or zirconium.

18. A process for producing wear-resistant coatings as recited in claim 16, in which the hard particles are selected from the group consisting of: tungsten carbide, cobalt-bonded tungsten carbide, nickel-bonded tungsten carbide, chromium carbide, nickel-bonded chromium, cobalt-bonded chromium carbide, tantalum carbide, niobium carbide, and vanadium carbide.

19. A process for producing wear resistant coatings on the surface of a metal substrate, comprising the steps of:
    a. first, applying a layer of paint having a dispersion of hard particles and braze particles onto the surface;
    b. then, heating said substrate and paint layer and braze alloy layer to a temperature above the liquidus of the braze alloy but below the solidus of the substrate; and then
    c. cooling the coated substrate to ambient temperature.

20. A process for producing wear resistant coatings on the surface of a metal substrate as recited in claim 19, wherein said hard particles are braze alloy particles including hard precipitates.

21. A process for producing wear resistant coatings on the surface of a metal substrate as recited in claim 19, wherein said hard particles are different from the braze particles.

22. A process for producing wear resistant coatings on the surface of a metal substrate as recited in claim 19, wherein said hard particles are different from the braze particles, and wherein said braze particles include hard precipitates.

23. A process for producing wear resistant coatings on the surface of a metal substrate, wherein said hard particles are taken from the group consisting of: tungsten carbide, cobalt-bonded tungsten carbide, nickel-bonded tungsten carbide, chromium carbide, nickel-bonded chromium, cobalt-bonded chromium carbide, tantalum carbide, niobium carbide, vanadium carbide, and nickel-chrome hardfacing alloys containing boron or silicon for melting point reduction and iron, molybdenum, tungsten, manganese, carbon or combinations thereof for obtaining the desired mechanical properties, wherein said hard particles have a Rockwell C hardness greater than 50.

24. A process for producing wear resistant coatings on a concave surface, comprising the steps of:
(a) applying a layer of wet adhesive to said concave surface,
(b) applying dry hard particles onto said wet adhesive layer to embed the hard particles into the wet adhesive layer,
(c) drying the adhesive with the imbedded hard particles,
(d) applying another layer of wet adhesive over the dried layer of hard particles,
(e) applying dry powdered braze alloy onto said other layer of wet adhesive to embed the braze alloy into the wet adhesive layer,
(f) drying the adhesive with imbedded braze alloy particles;
(g) heating said substrate with the layers of hard particles and the braze alloy to a temperature above the liquidus of the braze alloy but below the solidus of the substrate, and then
(h) cooling the coated substrate to ambient temperature.

25. A process as recited in claim 24, wherein the concave surface is an ironbase alloy fan blade.

26. A process as recited in claim 24, wherein the concave surface is the interior of a pipe.

27. A process as recited in claim 24, wherein the adhesive is applied to the interior of the pipe by spraying.

28. A process for producing coatings of hard particles on the surface of a substrate material, comprising the steps of:
(a) wetting the surface of the substrate material with a basic compound selected from the group consisting of hydroxides of alkali and alkaline earth metals, amines, and ammonium hydroxide;
(b) submerging the wetted substrate into in a paint comprising over 15 volume percent hard particles dispersed in a paint containing an acid-containing thickening agent that had been partially neutralized by adjusting its acidity to a pH of less than 7 for sufficient time to allow the basic compound to diffuse into the paint to substantially increase its viscosity;
(c) removing the submerged substrate from the paint to form a layer of paint having a viscosity adjacent to the surface of the substrate substantially higher than the viscosity of the paint itself; and
(d) drying the paint to form a coating of particles on the substrate.

29. A process as recited in claim 28, in which the acid-containing thickening agent is an acid containing cross-linked acrylic emulsion copolymer.

30. A process for hardfacing metal surfaces, comprising the steps of:
(a) first, wetting the surface of the substrate metal with a basic compound selected from the group consisting of hydroxides of alkali and alkaline earth metals, amines, and ammonium hydroxide;
(b) then, submerging the wetted substrate into in a paint comprising over 15 volume percent of fusible metallic hardfacing particles dispersed in a paint containing an unneutralized acid-containing thickening agent, wherein the pH of the paint is less than pH 7, said fusible metallic hardfacing particles being selected from the group consisting of nickel, cobalt, or iron base hardfacing alloy, and mixtures of hard particles with braze alloys;
(c) then, allowing the substrate to be submerged for sufficient time to allow the basic compound to diffuse into the paint to substantially increase the paint's viscosity;
(d) then, removing the submerged substrate from the paint to form a layer of paint in which .the paint viscosity adjacent to the surface of the substrate is substantially higher than the viscosity of the paint alone;
(e) then, drying the paint to form a coating of particles on the substrate;
(f) then, heating the coated substrate in an inert atmosphere above the solidus of said hardfacing alloy or braze alloy to metallurgically bond the hardfacing particles to the metal substrate.

31. A process as recited in claim 30 in which the acid-containing thickening agent is an acid containing cross-linked acrylic emulsion copolymer.

32. A process for hardfacing sheet steel, comprising the steps of:
(a) moving a flat horizontal steel sheet beneath sprayers;
(b) spraying a layer of adhesive onto said steel sheet
(c) then spraying the desired amount of hard particle powder onto the layer of adhesive;
(d) then spraying adhesive over the hard particle powder;
(e) then spraying the desired amount of braze alloy powder over the adhesive;
(f) then moving the sheet through an open-ended hydrogen sintering furnace that melts the braze, thus forming a metallurgically bonded composite of hard particles and braze on the top surface of a steel sheet.

33. A process as recited in claim 32, wherein said steel is low carbon steel.

* * * * *

UNITED STATES PATENT AND TRADEMARK OFFICE
CERTIFICATE OF CORRECTION

PATENT NO. : 6,649,682 B1
DATED : November 18, 2003
INVENTOR(S) : Ernest J. Breton, John M. Hardzel and Otis K. Tennant

It is certified that error appears in the above-identified patent and that said Letters Patent is hereby corrected as shown below:

Column 6,
Line 46, following the phrase "ratio greater than", insert -- 30 --.

Column 15,
Line 35, delete the number "3500" and insert therefor -- 350º --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,649,682 B1 | Page 1 of 1 |
| APPLICATION NO. | : 09/888672 | |
| DATED | : November 18, 2003 | |
| INVENTOR(S) | : Ernest J. Breton, John M. Handzel and Otis K. Tennant | |

It is certified that error appears in the above-identified patent and that said Letters Patent is hereby corrected as shown below:

Delete claims 16-33

Signed and Sealed this

Twenty-eighth Day of November, 2006

JON W. DUDAS
*Director of the United States Patent and Trademark Office*